US011982537B2

(12) United States Patent
Sanchez et al.

(10) Patent No.: US 11,982,537 B2
(45) Date of Patent: May 14, 2024

(54) SYSTEMS AND METHODS FOR GENERATING DYNAMIC TRANSIT ROUTES

(71) Applicant: BlueOwl, LLC, San Francisco, CA (US)

(72) Inventors: Kenneth Jason Sanchez, San Francisco, CA (US); Theobolt N. Leung, San Francisco, CA (US); Mary Piontkowski, San Francisco, CA (US); Bennett Smith, Inver Grove, MN (US)

(73) Assignee: BLUEOWL, LLC, San Francisco, CA (US)

( * ) Notice: Subject to any disclaimer, the term of this patent is extended or adjusted under 35 U.S.C. 154(b) by 661 days.

(21) Appl. No.: 16/809,252

(22) Filed: Mar. 4, 2020

(65) Prior Publication Data
US 2024/0094019 A1    Mar. 21, 2024

(51) Int. Cl.
*G01C 21/34* (2006.01)
*G06N 5/02* (2023.01)
*G06N 5/04* (2023.01)
*G05D 1/00* (2006.01)

(52) U.S. Cl.
CPC ..... *G01C 21/3484* (2013.01); *G01C 21/3415* (2013.01); *G06N 5/02* (2013.01); *G06N 5/04* (2013.01); *G05D 1/0088* (2013.01)

(58) Field of Classification Search
CPC .. G01C 21/3484; G01C 21/3415; G06N 5/02; G06N 5/04; G05D 1/0088
See application file for complete search history.

(56) References Cited

U.S. PATENT DOCUMENTS

| 6,736,317 B1* | 5/2004 | McDonald ............. G07B 15/02 235/382 |
| 9,689,694 B2 | 6/2017 | Lord et al. |
| 2015/0204684 A1 | 7/2015 | Rostamian et al. |
| 2016/0371973 A1* | 12/2016 | Holleczek ............. H04W 4/029 |
| 2017/0270447 A1 | 9/2017 | Borean et al. |

(Continued)

FOREIGN PATENT DOCUMENTS

WO    2018/163157 A1    9/2018

OTHER PUBLICATIONS

Mora et al., "On-demand high-capacity ride-sharing via dynamic trip-vehicle assignment", PNAS, vol. 114, Jan. 17, 2017, pp. 462-467.

*Primary Examiner* — Peter D Nolan
*Assistant Examiner* — Ashley L Redhead, Jr.
(74) *Attorney, Agent, or Firm* — BRYAN CAVE LEIGHTON PAISNER LLP

(57) ABSTRACT

The present embodiments may relate to generating dynamic transit routes based at least in part upon telematics data of users. For instance, a transit analysis (TA) computing device may be configured to: (1) receive telematics data from the plurality of user mobile devices, each user mobile device of the plurality of user mobile devices corresponding to one user identifier of a plurality of user identifiers; (2) build, for each user identifier of the plurality of user identifiers, a transit model; (3) generate, for each user identifier of the plurality of user identifiers, based at least in part upon the transit model associated with the user identifier, one or more transit predictions; and/or (4) generate, based at least in part upon the one or more transit predictions, for each user identifier of the plurality of user identifiers, a dynamic transit route.

20 Claims, 7 Drawing Sheets

(56) References Cited

U.S. PATENT DOCUMENTS

| | | | |
|---|---|---|---|
| 2018/0180431 A1* | 6/2018 | Su | G01C 21/3423 |
| 2019/0204101 A1* | 7/2019 | MacRae | G06Q 50/30 |
| 2020/0020227 A1* | 1/2020 | Ran | G08G 1/075 |
| 2020/0042019 A1* | 2/2020 | Marczuk | G08G 1/205 |
| 2020/0104770 A1* | 4/2020 | Aich | G01C 21/3423 |
| 2020/0141746 A1* | 5/2020 | Srnec | G01C 21/3691 |
| 2020/0167702 A1* | 5/2020 | Beaurepaire | G01C 21/3438 |

* cited by examiner

SYSTEMS AND METHODS FOR GENERATING DYNAMIC TRANSIT ROUTES

FIELD OF THE DISCLOSURE

The present disclosure relates to transportation data analytics, and more particularly, to systems and methods for generating dynamic transit routes based at least in part upon telematics data of users.

BACKGROUND

Individuals use mobile devices (e.g., mobile telephones) for a variety of purposes and often carry mobile devices while traveling. Such usage may be a source of data. For example, mobile devices may be equipped to generate data (e.g., telematics data) using instruments built into the mobile device, such as an accelerometer or global positioning system (GPS) device. Further, some vehicles (e.g., connected vehicles) are equipped with communications abilities (e.g., vehicle-to-infrastructure (V2I), vehicle-to-vehicle (V2V), and/or vehicle-to-network (V2N) communication). Such vehicles are often equipped with a variety of sensors that are also potential sources of telematics data. Computing devices may use this telematics data obtained from mobile devices, connected vehicles, and/or other sources for a variety of applications.

However, current computing devices generally do not use such telematics data to address certain problems in a transit context. One example of such a problem is bus routing. Current bus routes must be designed and altered manually. This process may be based, for example, upon costly studies, which may only predict ridership for a certain point in time. As such, bus routes are not frequently altered to achieve improved accessibility, ridership, or otherwise optimized, and even when they are updated, they may rapidly become obsolete due to the ever changing needs of commuters. A further example is carpooling. Carpools are generally formed on an ad hoc basis between individuals who already know each other and/or actively seek out other carpoolers. As such, carpool routes may leave out potential riders, and are generally not designed and/or updated for improved efficiency. These shortcomings of current transit options often discourage and/or prevent commuters from choosing transit options that may, for example, reduce congestion, danger of collisions, and/or carbon pollution. A computing device capable of developing solutions to such transit problems (e.g., inefficient bus routes and/or carpool routes) based at least in part upon real-time telematics data are therefore desirable.

BRIEF SUMMARY

The present embodiments may relate to, inter alia, systems and methods for generating dynamic transit routes based at least in part upon telematics data. A dynamic transit route may be a transit route (e.g., for a bus, a carpool, a transportation network company (TNC) vehicle, and/or another vehicle) that is generated and/or periodically updated based at least in part upon actual usage data, for example, to be optimized for and/or to achieve a particular, for example, length, transit time, fuel efficiency, and/or other measures. The dynamic transit routes may be generated based at least in part upon models/and or predictions of transit behavior of individual users that are generated based at least in part upon telematics data corresponding to the user. The generated dynamic transit routes may enable, for example, a transit system such as a bus system and/or a carpool system to achieve greater efficiency (e.g., cost, time and/or environmental efficiency), to improve and/or encourage ridership, and/or to otherwise be improved. Dynamic transit routes may further enable, for example, a premium of an insurance policy to be altered based at least in part upon a user opting in to transit systems that utilize dynamic transit routes. For example, an insurance premium may be lowered based at least in part upon a reduced amount of risk associated with transit options utilizing dynamic transit routes and/or to encourage insured individuals to utilize such transit options.

In one aspect, a transit analytics (TA) computing device including one processor in communication with at least one memory device and a plurality of user mobile devices may be provided. The at least one processor may be configured to: (1) receive telematics data from the plurality of user mobile devices, each user mobile device of the plurality of user mobile devices corresponding to one user identifier of a plurality of user identifiers; (2) store the telematics data in a database in association with the plurality of user identifiers; (3) build, for each user identifier of the plurality of user identifiers, a transit model; (4) generate, for each user identifier of the plurality of user identifiers, based at least in part upon the transit model associated with the user identifier, one or more transit predictions; and/or (5) generate, based at least in part upon the one or more transit predictions, for each user identifier of the plurality of user identifiers, a dynamic transit route. The TA computing device may include additional, less, or alternate functionality, including that discussed elsewhere herein.

In another aspect, a computer-implemented method may be provided. The computer-implemented method may be performed by a transit analytics (TA) computing device including one processor in communication with at least one memory device and a plurality of user mobile devices. The computer-implemented method may include: (1) receiving, by the TA computing device, telematics data from the plurality of user mobile devices, each user mobile device of the plurality of user mobile devices corresponding to one user identifier of a plurality of user identifiers; (2) storing, by the TA computing device, the telematics data in a database in association with the plurality of user identifiers; (3) building, by the TA computing device, for each user identifier of the plurality of user identifiers, a transit model; (4) generating, by the TA computing device, for each user identifier of the plurality of user identifiers, based at least in part upon the transit model associated with the user identifier, one or more transit predictions; and/or (5) generating, by the TA computing device, based at least in part upon the one or more transit predictions, for each user identifier of the plurality of user identifiers, a dynamic transit route. The computer-implemented method may include additional, less, or alternate actions, including those discussed elsewhere herein.

In another aspect, at least one non-transitory computer-readable media having computer-executable instructions embodied thereon may be provided that, when executed by a transit analytics (TA) computing device including one processor in communication with at least one memory device and a plurality of user mobile devices, may cause the at least one processor to: (1) receive telematics data from the plurality of user mobile devices, each user mobile device of the plurality of user mobile devices corresponding to one user identifier of a plurality of user identifiers; (2) store the telematics data in a database in association with the plurality of user identifiers; (3) build, for each user identifier of the plurality of user identifiers, a transit model; (4) generate, for each user identifier of the plurality of user identifiers, based at least in part upon the transit model associated with the user identifier, one or more transit predictions; and/or (5) generate, based at least in part upon the one or more transit predictions, for each user identifier of the plurality of user identifiers, a dynamic transit route. The computer-executable instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DRAWINGS

Figure 1:
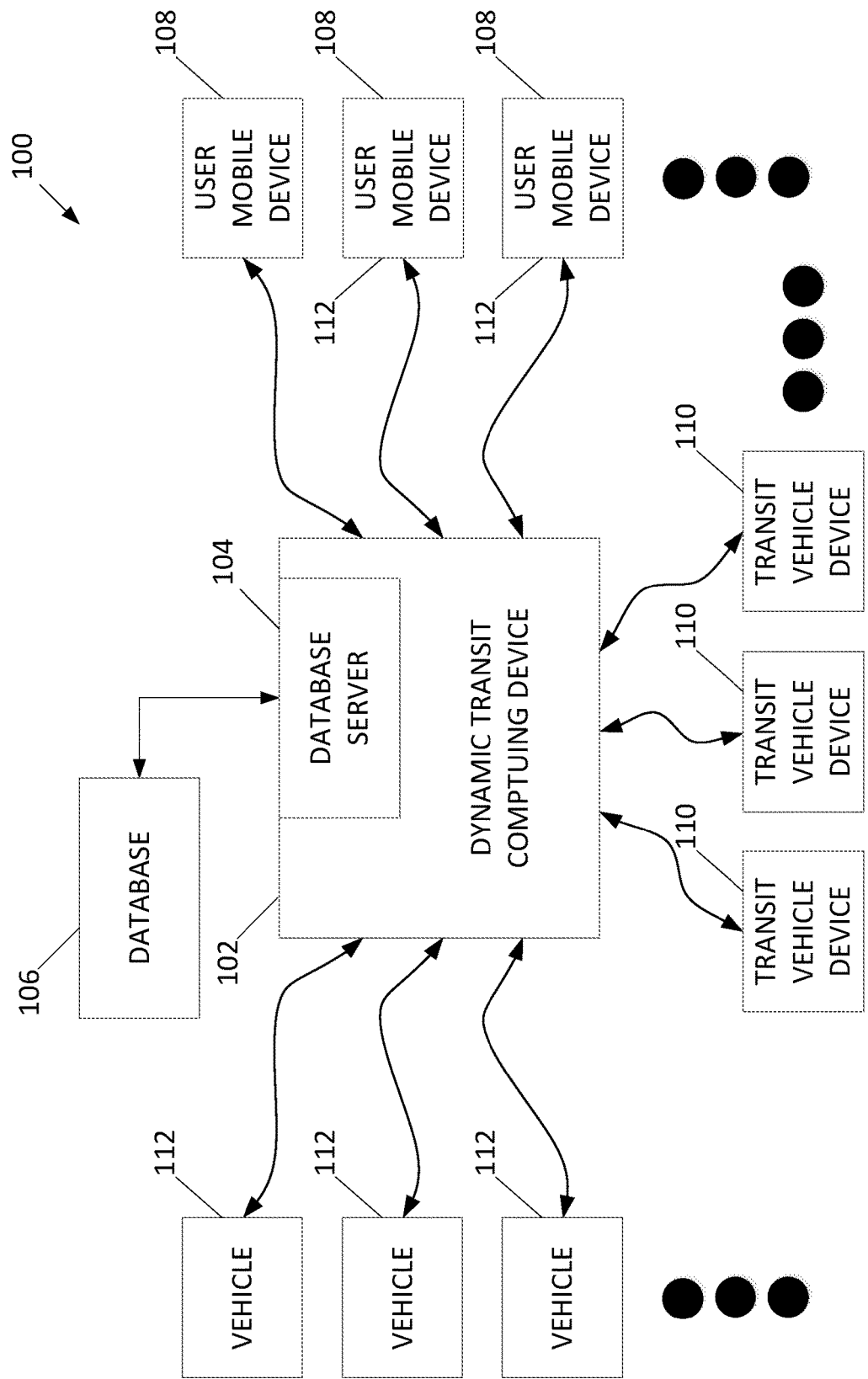
FIG. 1 depicts an exemplary transit analytics (TA) system in accordance with an exemplary embodiment of the present disclosure.

The present embodiments may relate to, inter alia, systems and methods for generating dynamic transit routes based at least in part upon telematics data. A dynamic transit route may be a transit route (e.g., for a bus, a carpool, a transportation network company (TNC) vehicle, and/or another vehicle) that is generated and/or periodically updated based at least in part upon actual usage data, for example, to be optimized for and/or to achieve a particular, for example, length, transit time, fuel efficiency, and/or other measures. The telematics data may include, for example, historical location data (e.g., global positioning system (GPS) data), and be received from, for example, a plurality of user mobile devices (e.g., mobile phones), connected vehicles, and/or other sources capable of generating and transmitting telematics data. The telematics data may be stored in a database in association with one user identifier of a plurality of user identifiers corresponding to a source of the telematics data. Transit models that characterize the transit behavior of a user may be built for each of the user identifiers based at least in part upon the telematics data. Transit predictions (e.g., a time, an origin location, and a destination location) for future trips of a user may be generated based at least in part upon the transit models. Dynamic transit routes may be generated based at least in part upon the transit predictions. In some embodiments, the transit models, transit predictions, and/or dynamic transit routes may be generated using machine learning techniques and/or artificial intelligence (AI) techniques. In some embodiments, at least some aspects of systems and methods may be performed by a transportation analytics (TA) computing device.

The systems and methods may further include generating and transmitting a notification message to a user mobile device including one or more candidate dynamic transit routes that may be utilized by a user corresponding to the user mobile device. The notification message may further include, for example, economic and/or social benefits (e.g., fuel cost savings, insurance cost savings, and/or environmental pollution reduction) that may encourage the user to utilize the dynamic transit route. The economic and/or social benefits may include statistics calculated based at least in part upon, for example, the telematics data. The user may submit a response to the notification message indicating that the user has accepted or declined use of the dynamic transit route. The dynamic transit route may be modified, for example, when a user has declined to use the dynamic transit route.

The systems and method may further include generating and transmitting the dynamic transit route to a transit vehicle computing device. The transit vehicle computing device may be, for example, a computing device associated with a dispatching service, a mobile device associated with user, a carpool driver, and/or a TNC driver, and/or a computing device onboard a connected vehicle and/or an autonomous vehicle. In embodiments, where the transit vehicle computing device is associated with an autonomous vehicle, the autonomous vehicle may be configured to autonomously implement the dynamic transit route, for example, by traveling and making transit stops along the route (e.g., to collect and drop off passengers).

The systems and methods may enable a transit system such as a bus system and/or a carpool system, for example, to achieve greater efficiency (e.g., cost, time and/or environmental efficiency), to improve and/or encourage ridership, and/or to otherwise be improved. The systems and methods may further enable a premium of an insurance policy to be altered based at least in part upon a user opting in to transit systems that utilize dynamic transit routes. For example, an insurance premium may be lowered based at least in part upon a reduced amount of risk associated with transit options utilizing dynamic transit routes and/or to encourage insured individuals to utilize such transit options.

Examples of Receiving and Storing Telematics Data

In one exemplary embodiment, the TA computing device may receive telematics data from a plurality of user mobile devices and store the telematics data in a database. Each user mobile device of the plurality of user mobile devices may correspond to one user identifier of a plurality of user identifiers. The user identifiers may be unique identifiers associated with users, and may be used by the TA computing device to associate, for example, telematics data with a particular user in a database. For example, the received telematics data may be stored in the database in association with a user identifier that corresponds to a user mobile device that is a source of the telematics data.

The telematics data may be generated by sensors onboard the user mobile devices. For example, the user mobile devices may include one or more accelerometers, gyroscopes, GPS devices, and/or other sensors. The user mobile devices may be capable of executing a mobile application (app) that causes the user mobile device to collect telematics data and transmit the telematics data to the TA computing device. In some embodiments, such telematics data are collected only when the user associated with the user mobile device has opted in to services associated TA computing device.

In some embodiments, the TA computing device may further receive telematics data from other sources, such as connected vehicles and/or autonomous vehicles. Connected vehicles are vehicles equipped with communications abilities (e.g., vehicle-to-infrastructure (V2I), vehicle-to-vehicle (V2V), and/or vehicle-to-network (V2N) communication) in order to communicate, for example, with remote computing devices. Autonomous vehicles are that use automation to control certain functions of a vehicle (e.g., speed and/or steering), for example, to assist a driver in operating the vehicle and/or to travel autonomously (e.g., without input from the driver). An autonomous vehicle capable of communicating with an external network may be an example of a connected vehicle. Such vehicles may be equipped with sensors (accelerometers, gyroscopes, GPS devices, and/or other sensors) that may generate telematics data. A connected vehicle or autonomous vehicle may be configured to transmit such telematics data to the TA computing device, for example, using a cellular based or wireless local area network (WLAN) based V2N connection.

Examples of Building Transit Models to Generate Transit Predictions

In one exemplary embodiment, the TA computing device may build, for each user identifier of the plurality of user identifiers, a transit model. The transit model for a user may characterize transportation behavior of the user. For example, the transit model may include typical times, origin locations, destination locations, and/or routes of travel for the user. The TA computing device may build the transit model using, for example, machine learning techniques and/or AI techniques. For example, the TA computing device may identify patterns (e.g., common times, origin locations, destination locations, routes of travel, and/or other transit patterns) in the telematics data and build the transit model to include the identified patterns. In some embodiments, the TA computing device may periodically update (e.g., daily) the transit models based, for example, upon recently received telematics data (e.g., telematics data received subsequent to the last update of the transit model). The TA computing device may store the transit model in the database in association with the corresponding user identifier.

In one exemplary embodiment, the TA computing device may generate, for each user identifier of the plurality of user identifiers, one or more transit predictions. The transit predictions may include, for example, a predicted time, origin location, and/or a predicted destination location of a predicted future trip of the user. The TA computing device may generate the transit predictions based at least in part upon the transit model associated with the corresponding user identifier. For example, if a transit model for a particular user identifier indicates that the corresponding user travels each week day at 7:30 a.m. from a particular origin location (e.g., the user's home) to a particular destination location (e.g., the user's workplace), the TA computing device may generate a prediction that the user will make a similar trip for each future workday. Such transit predictions may correspond to trips taken on a periodic timeframe (e.g., a daily commute, a periodic trip to the grocery store, a monthly trip to a vacation property) or to a specific trip event (e.g., a trip to a concert of a certain band, where the transit model of the user indicates that the user typically attends concerts of the certain band when they are within a particular range of the user's home). In some embodiments, transit predictions may further be generated based at least in part upon calendar data and/or other data obtained from the user mobile device of the user (e.g., where a user has purchased airline tickets, a prediction may include a trip to the corresponding airport at the corresponding date and/or time). In some embodiments, the TA computing device may store the generated transit predictions in the database in association with the corresponding user identifier.

Examples of Generating Dynamic Transit Routes

In one exemplary embodiment, the TA computing device may generate a dynamic transit route. The dynamic transit route may be a transit route (e.g., for a bus, a carpool, a transportation network company (TNC) vehicle, and/or another vehicle) that is generated to achieve, for example, a certain length, transit time, fuel efficiency, amount of air pollution generated, and/or other target measures. The TA computing device may generate the dynamic transit route based at least in part upon the plurality of transit predictions, for each user identifier of the plurality of user identifiers. For example, a plurality of transit predictions may correspond to a morning commute of a plurality of users in a certain geographical area. The TA computing device may generate one or more dynamic transit routes that, when implemented (e.g., by a bus and/or carpool), enable each of the users to commute to work via the dynamic transit routes.

In some embodiments, the TA computing device may generate the dynamic transit routes based at least in part upon one or more of many different factors, for example, the length of each dynamic transit route, a total amount of time to travel each dynamic transit route, an average amount of time for a particular user to complete their trip along the dynamic transit route, an average proximity of each user's origin location a respective pick up location, an average proximity of each destination to a respective drop off location, a maximum passenger capacity for each vehicle implementing the dynamic transit routes, a number of vehicles available to implement the dynamic transit routes, traffic conditions (e.g., congestion), similarity of potential passengers (e.g., passengers determined to have similar lifestyles based at least in part upon telematics and/or other data), or other factors that affect the ability of vehicles implementing the dynamic transit routes to meet the target measures. Each dynamic transit route may be designed to implement any number of trips for any number of users. For example, a dynamic transit route may be implemented by a bus transporting several passengers to several different destinations, or the dynamic transit route may be implemented by a car transporting a single passenger to a single particular destination. In some embodiments, the TA computing device will generate dynamic transit routes having a specified vehicle size (e.g., passenger capacity). In some embodiments, the TA computing device may utilize machine learning techniques and/or AI techniques to generate the dynamic transit routes. In some embodiments, the TA computing device may periodically generate new dynamic transit routes and/or modify existing dynamic transit routes. In some embodiments, the dynamic transit routes may be stored in the database in association with the one or more user identifiers that correspond to the dynamic transit route.

In some embodiments, the TA computing device may generate the dynamic transit routes to include multiple sub-trips. In other words, a user may travel a first distance (e.g., a first sub-trip) in a first vehicle and then board a second vehicle to travel a second distance (e.g., a second sub-trip), wherein the first sub-trip and the second sub-trip are combined to define the total trip of the user. Accordingly, a single vehicle may be used to implement multiple dynamic transit routes and/or a single dynamic transit route may be implemented using multiple different vehicles.

Examples of Generating and Transmitting Notification Messages

In one exemplary embodiment, the TA computing device may generate and transmit notification messages to user mobile devices including candidate dynamic transit routes for the corresponding user. The notification messages may be displayed in the app running on the user mobile device. Additionally or alternatively, the notification may be transmitted via email, via short message service (SMS) messages, and/or through another messaging service. The notification may further include, for example, an estimated pickup time for the user, an estimated time of arrival, a pick up and/or drop off location, a vehicle type, other users associated with the dynamic transit route, whether the dynamic transit route is a regularly scheduled route, and/or other information relevant to the user regarding the dynamic transit route.

In some embodiments, the TA computing device may generate the notification message to further include information about potential social and/or economic benefits of utilizing the dynamic transit route rather than, for example, using a private vehicle. For example, the message may include a statement about fuel cost savings, insurance cost savings, environmental pollution reduction, and/or another benefit that may encourage the user to utilize the dynamic transit route. In some embodiments, the TA computing device may include in the notification message statistics relating to the potential benefit, sometimes referred to herein as "potential benefit statistics." The TA computing device may calculate such potential benefit statistics, for example, based at least in part upon telematics data associated with the corresponding user. For example, the TA computing device may predict an amount of fuel cost savings, insurance savings, and/or environmental pollution reduction for the user if the user were to utilize the dynamic transit route. In some embodiments, users may view such potential benefit statistics and/or benefit statistics of past trips (e.g., for each trip and/or in aggregate) via the app (e.g., in a virtual dashboard). In some embodiments, a potential benefit statistic may include additional information relating to potential changes to the user's transit habits. For example, a potential benefit statistic may include information relating to traffic conditions of commuting at one time versus another time, (e.g., "Leaving 15 minutes earlier will reduce your commute time by 30 minutes.").

In some embodiments, the TA computing device may receive input from the user. For example, the TA computing device may receive a response message from the candidate user mobile device after transmitting the notification message. The response message may include, for example, an indicator that a user accepts or declines to use the dynamic transit route. For example, the user may not wish to use shared transportation in that particular instance, and/or the user may not need transportation at that particular time and/or to that particular location (e.g., if a transit prediction is incorrect). If the response message indicates that the user is declining to use the dynamic transit route, the TA computing device may modify the dynamic transit route based at least in part upon the indicator, for example, to give less weight to the candidate user's predicted origin location and destination location. Additionally or alternatively, if a user indicates that the user will utilize the dynamic transit route, the TA computing device may modify the dynamic transit route based at least in part upon the indicator, for example, to give more weight to the candidate user's origin location and destination location. In some embodiments, the response message may include an indication of whether an associated transit prediction was correct and/or incorrect, and the transit model associated with the user may be updated accordingly. In some embodiments, the user may submit such response messages though the app, via email, via SMS, and/or via another messaging service.

Examples of Applications of Dynamic Transit Routes

In some embodiments, the generated dynamic transit routes may be used to implement a transportation service (e.g., a bus service and/or a TNC). The TA computing device may transmit the dynamic transit routes to, for example, a transit vehicle computing device associated with the transportation service (e.g., as a map and/or street directions). For example, in some embodiments, the transit vehicle computing device may be associated with a dispatching service (e.g., for a bus service and/or TNC), and the dynamic transit routes may be used to automatically direct vehicles associated with the service (e.g., by transmitting the dynamic transit routes and/or corresponding directions to operators of the vehicles).

In some embodiments, the dynamic transit routes may be transmitted to individual carpool drivers that have opted in to the transportation service (e.g., at a user mobile device associated with the carpool driver). In some embodiments, users may opt in to be a carpool driver, for example, using the app. In such embodiment, the user may opt to be available as a driver for a dynamic transit route, for example, during a specified time period (e.g., a day of the week and/or a time of day), during which generated dynamic transit routes may be assigned to the driver.

In some embodiments, the transit vehicle computing device may be associated with (e.g., onboard) a connected vehicle or an autonomous vehicle. In embodiments where the dynamic transit routes are received by an autonomous vehicle, the autonomous vehicle may be configured to autonomously travel the dynamic transit route, for example, to collect and drop of users associated with the dynamic transit route.

In some embodiments, the TA computing device may be used to facilitate providing insurance coverage for users of the dynamic transit routes. For example, the TA computing device may calculate an amount of risk associated with one or more upcoming trips taken by the user, for example, utilizing machine learning techniques and/or AI techniques. The TA computing device may calculate an insurance premium by applying, for example, a set of insurance rules to the calculated amount of risk. The premium may be calculated based at least in part upon, for example, an expected number of trips using the dynamic transit routes for a next period (e.g., one month), and/or specific upcoming trips using the dynamic transit routes where the user has confirmed that the user will utilize the dynamic transit routes for the upcoming trips (e.g., by submitting a response message via the app).

In some embodiments, a user may be enrolled in an insurance policy that assesses the user based at least in part upon the user's actual transportation behavior (e.g., a usage-based insurance policy). In such embodiments, a user may have an insurance premium for the usage-based insurance policy reduced for utilizing the dynamic transit routes instead of another form of transit (e.g., driving oneself). The TA computing device may display such a discount to the user, for example, via the app and/or a message as a potential benefit statistic as described above.

At least one of the technical problems addressed by this system may include: (i) inability of computing devices to build models characterizing a user's transit patterns base upon telematics data; (ii) inability of a computing device to generate transit predictions based at least in part upon telematics data; (iii) inability of a computing device to generate dynamic transit routes based at least in part upon telematics data; (iv) inability of a computing device to generate dynamic transit routes in real time; (v) inefficiency in developing transit routes based at least in part upon actual transit behavior of users; (vi) inability of computing devices to notify potential users of transit options in real time; (vii) inability of computing devices to generate individualized notification messages of potential transit options; (viii) cost, time, and environmental inefficiencies of transit routes that are not dynamically generated to improve certain parameters; and/or (ix) inability of autonomous vehicles to automatically implement dynamic transit routes.

A technical effect of the systems and processes described herein may be achieved by performing at least one of the following steps: (i) receiving telematics data from the plurality of user mobile devices, each user mobile device of the plurality of user mobile devices corresponding to one user identifier of a plurality of user identifiers; (ii) storing the telematics data in a database in association with the plurality of user identifiers; (iii) building, for each user identifier of the plurality of user identifiers, a transit model; (iv) generating, for each user identifier of the plurality of user identifiers, based at least in part upon the transit model associated with the user identifier, one or more transit predictions; and/or (v) generating, based at least in part upon the one or more transit predictions, for each user identifier of the plurality of user identifiers, a dynamic transit route.

The technical effect achieved by this system may be at least one of: (i) ability for computing devices to build models characterizing a user's transit patterns base upon telematics data; (ii) ability for a computing device to generate transit predictions based at least in part upon telematics data; (iii) ability for a computing device to generate dynamic transit routes based at least in part upon telematics data; (iv) ability for a computing device to generate dynamic transit routes in real time; (v) increased efficiency in developing transit routes based at least in part upon actual transit behavior of users; (vi) ability for computing devices to notify potential users of transit options in real time; (vii) ability for computing devices to generate individualized notification messages of potential transit options; (viii) increased cost, time, and/or environmental efficiency of transit routes that are not dynamically generated to improve certain parameters; and/or (ix) ability for autonomous vehicles to automatically implement dynamic transit routes.

Exemplary Systems for Generating Dynamic Transit Routes

Figure 2:
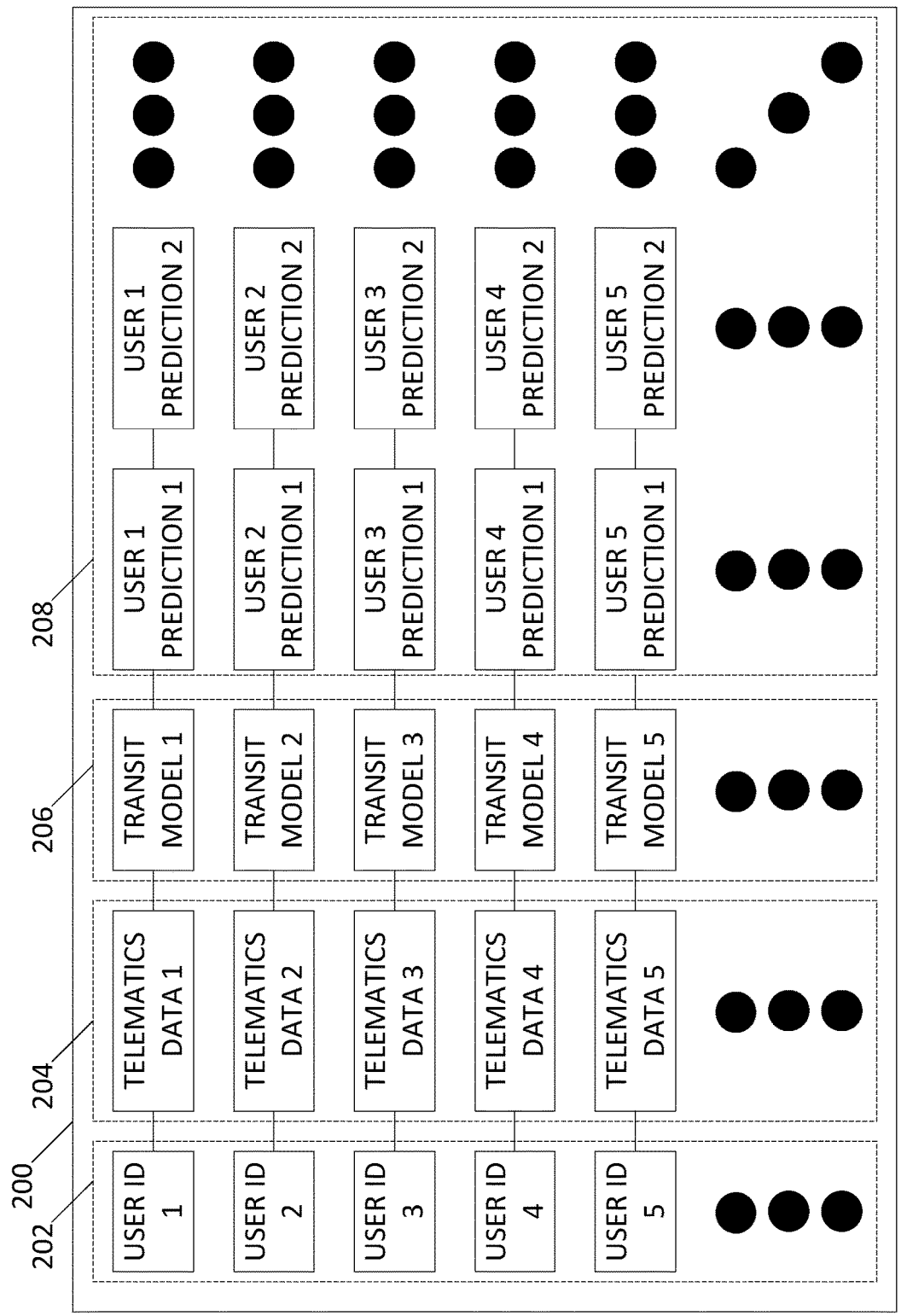
FIG. 2 depicts an exemplary data structure that may be used with the TA system illustrated in FIG. 1.

FIG. 1 depicts an exemplary transit analytics (TA) system 100. FIG. 2 depicts an exemplary data structure 200 that may be used to implement TA system 100. TA system 100 may include a TA computing device 102 that includes one database server 104. TA system may further include a database 106, a plurality of user mobile device 108, one or more transit vehicle computing devices 110, and/or one or more connected vehicles 112. Database 106, user mobile devices 108, transit vehicle computing devices 110, and/or connected vehicles 112 may be in communication with TA computing device 102. Database 106 may be implemented using data structure 200.

In one exemplary embodiment, TA computing device 102 may receive telematics data 204 from user mobile devices 108 and store the telematics data in database 106. Each of the user mobile devices 108 may correspond to one user identifier of a plurality of user identifiers 202. User identifiers 202 may be unique identifiers associated with users, and may be used by TA computing device 102 to associate, for example, telematics data 204 with a particular user in database 106. For example, the received telematics data 204 may be stored in database 106 in association with a user identifier 202 that corresponds to a user mobile device 108 that is a source of telematics data 204.

Telematics data 204 may be generated by sensors onboard user mobile devices 108. For example, user mobile devices 108 may include one or more accelerometers, gyroscopes, GPS devices, and/or other sensors. User mobile devices 108 may be capable of executing a mobile application (app) that causes user mobile device 108 to collect telematics data 204 and transmit telematics data 204 to TA computing device 102. In some embodiments, such telematics data 204 is collected only when the user associated with user mobile device 108 has opted in to services associated with TA computing device 102.

In some embodiments, TA computing device 102 may further receive telematics data from other sources, such as connected vehicles 112 and/or autonomous vehicles. Connected vehicles 112 are vehicles equipped with communications abilities (e.g., vehicle-to-infrastructure (V2I), vehicle-to-vehicle (V2V), and/or vehicle-to-network (V2N) communication) in order to communicate, for example, with remote computing devices. Autonomous vehicles are that use automation to control certain functions of a vehicle (e.g., speed and/or steering), for example, to assist a driver in operating the vehicle and/or to travel autonomously (e.g., without input from the driver). An autonomous vehicle capable of communicating with an external network may be an example of connected vehicle 112. Such vehicles may be equipped with sensors (accelerometers, gyroscopes, GPS devices, and/or other sensors) that may generate telematics data 204. Connected vehicle 112 or autonomous vehicle may be configured to transmit such telematics data 204 to TA computing device 102, for example, using a cellular based or wireless local area network (WLAN) based V2N connection.

In one exemplary embodiment, TA computing device 102 may build, for each user identifier of the plurality of user identifiers 202, a transit model 206. Transit model 206 may characterize transportation behavior of a user. For example, transit model 206 may include typical times, origin locations, destination locations, and/or routes of travel for the user. TA computing device 102 may build transit model 206 using, for example, machine learning techniques and/or AI techniques. For example, TA computing device 102 may identify patterns (e.g., common times, origin locations, destination locations, routes of travel, and/or other transit patterns) in telematics data 204 and build transit model 206 to include the identified patterns. In some embodiments, TA computing device 102 may periodically update (e.g., daily) transit model 206 based, for example, upon recently received telematics data 204 (e.g., telematics data 204 received subsequent to the last update of the transit model). TA computing device 102 may store transit model 206 in database 106 in association with the corresponding user identifier 202.

In one exemplary embodiment, TA computing device 102 may generate, for each of the user identifiers 202, one or more transit predictions 208. Transit predictions 208 may include, for example, a predicted time, origin location, and/or a predicted destination location of a predicted future trip of the user. TA computing device 102 may generate transit predictions 208 based at least in part upon a transit model 206 associated with the corresponding user identifier 202. For example, if transit model 205 for a particular user identifier 202 indicates that the corresponding user travels each week day at 7:30 a.m. from a particular origin location (e.g., the user's home) to a particular destination location (e.g., the user's workplace), TA computing device 102 may generate a transit prediction 208 that the user will make a similar trip for each future workday. Such transit predictions 208 may correspond to trips taken on a periodic timeframe (e.g., a daily commute, a periodic trip to the grocery store, a monthly trip to a vacation property) or to a specific trip event (e.g., a trip to a concert of a certain band, where the transit model of the user indicates that the user typically attends concerts of the certain band when they are within a particular range of the user's home). In some embodiments, transit predictions 208 may further be generated based at least in part upon calendar data and/or other data obtained from a user mobile device 108 of the user (e.g., where a user has purchased airline tickets, a prediction may include a trip to the corresponding airport at the corresponding date and/or time). In some embodiments, TA computing device 102 may store the generated transit predictions in database 106 in association with the corresponding user identifier 202.

In one exemplary embodiment, TA computing device 102 may generate a dynamic transit route. The dynamic transit route may be a transit route (e.g., for a bus, a carpool, a transportation network company (TNC) vehicle, and/or another vehicle) that is generated to achieve, for example, a certain length, transit time, fuel efficiency, amount of air pollution generated, and/or other target measures. TA computing device 102 may generate the dynamic transit route based at least in part upon transit predictions 208 for user identifiers 202. For example, transit predictions 208 may correspond to a morning commute of a plurality of users in a certain geographical area. TA computing device 102 may generate one or more dynamic transit routes that, when implemented (e.g., by a bus and/or carpool), enable each of the users to commute to work via the dynamic transit routes.

In some embodiments, TA computing device 102 may generate the dynamic transit routes based at least in part upon one or more of many different factors, for example, the length of each dynamic transit route, a total amount of time to travel each dynamic transit route, an average amount of time for a particular user to complete their trip along the dynamic transit route, an average proximity of each user's origin location a respective pick up location, an average proximity of each destination to a respective drop off location, a maximum passenger capacity for each vehicle implementing the dynamic transit routes, a number of vehicles available to implement the dynamic transit routes, traffic conditions (e.g., congestion), similarity of potential passengers (e.g., passengers determined to have similar lifestyles based at least in part upon telematics and/or other data), or other factors that affect the ability of vehicles implementing the dynamic transit routes to meet the target measures. Each dynamic transit route may be designed by TA computing device 102 to implement any number of trips for any number of users. For example, a dynamic transit route may be implemented by a bus transporting several passengers to several different destinations, or the dynamic transit route may be implemented by a car transporting a single passenger to a single particular destination. In some embodiments, TA computing device 102 will generate dynamic transit routes having a specified vehicle size (e.g., passenger capacity). In some embodiments, TA computing device 102 may utilize machine learning techniques and/or AI techniques to generate the dynamic transit routes. In some embodiments, TA computing device 102 may periodically generate new dynamic transit routes and/or modify existing dynamic transit routes. In some embodiments, the dynamic transit routes may be stored by TA computing device 102 in database 106 in association with one or more user identifiers 202 that correspond to the dynamic transit route.

In some embodiments, TA computing device 102 may generate the dynamic transit routes to include multiple sub-trips. In other words, a user may travel a first distance (e.g., a first sub-trip) in a first vehicle and then board a second vehicle to travel a second distance (e.g., a second sub-trip), wherein the first sub-trip and the second sub-trip are combined to define the total trip of the user. Accordingly, a single vehicle may be used to implement multiple dynamic transit routes and/or a single dynamic transit route may be implemented using multiple different vehicles.

In one exemplary embodiment, TA computing device 102 may generate and transmit notification messages to user mobile devices 108 including candidate dynamic transit routes for the corresponding user. The notification messages may be displayed in the app running on user mobile device 108. Additionally or alternatively, the notification may be transmitted via email, via short message service (SMS) messages, and/or through another messaging service. The notification may further include, for example, an estimated pickup time for the user, an estimated time of arrival, a pick up and/or drop off location, a vehicle type, other users associated with the dynamic transit route, whether the dynamic transit route is a regularly scheduled route, and/or other information relevant to the user regarding the dynamic transit route.

In some embodiments, TA computing device 102 may generate the notification message to further include information about potential social and/or economic benefits of utilizing the dynamic transit route rather than, for example, using a private vehicle. For example, the message may include a statement about fuel cost savings, insurance cost savings, environmental pollution reduction, and/or another benefit that may encourage the user to utilize the dynamic transit route. In some embodiments, TA computing device 102 may include in the notification message statistics relating to the potential benefit, sometimes referred to herein as "potential benefit statistics." TA computing device 102 may calculate such potential benefit statistics, for example, based at least in part upon telematics data 204 associated with the corresponding user. For example, TA computing device 102 may predict an amount of fuel cost savings, insurance savings, and/or environmental pollution reduction for the user if the user were to utilize the dynamic transit route. In some embodiments, users may view such potential benefit statistics and/or benefit statistics of past trips (e.g., for each trip and/or in aggregate) via the app (e.g., in a virtual dashboard). In some embodiments, a potential benefit statistic may include additional information relating to potential changes to the user's transit habits. For example, a potential benefit statistic may include information relating to traffic conditions of commuting at one time versus another time, (e.g., "Leaving 15 minutes earlier will reduce your commute time by 30 minutes.").

In some embodiments, TA computing device 102 may receive input from the user. For example, TA computing device 102 may receive a response message from the candidate user mobile device 108 after transmitting the notification message. The response message may include, for example, an indicator that a user accepts or declines to use the dynamic transit route. For example, the user may not wish to use shared transportation in that particular instance, and/or the user may not need transportation at that particular time and/or to that particular location (e.g., if a transit prediction 208 is incorrect). If the response message indicates that the user is declining to use the dynamic transit route, TA computing device 102 may modify the dynamic transit route based at least in part upon the indicator, for example, to give less weight to the candidate user's predicted origin location and destination location. Additionally or alternatively, if a user indicates that the user will utilize the dynamic transit route, TA computing device 102 may modify the dynamic transit route based at least in part upon the indicator, for example, to give more weight to the candidate user's origin location and destination location. In some embodiments, the response message may include an indication of whether an associated transit prediction 208 was correct and/or incorrect, and the transit model 206 associated with the user may be updated accordingly. In some embodiments, the user may submit such response messages though the app, via email, via SMS, and/or via another messaging service.

In some embodiments, the generated dynamic transit routes may be used to implement a transportation service (e.g., a bus service and/or a TNC). TA computing device 102 may transmit the dynamic transit routes to, for example, transit vehicle computing device 110 (e.g., as a map and/or street directions), which may be associated with the transportation service. For example, in some embodiments, transit vehicle computing device 110 may be associated with a dispatching service (e.g., for a bus service and/or TNC), and the dynamic transit routes may be used to automatically direct vehicles associated with the service (e.g., by transmitting the dynamic transit routes and/or corresponding directions to operators of the vehicles).

In some embodiments, the dynamic transit routes may be transmitted by TA computing device 102 to individual carpool drivers that have opted in to the transportation service (e.g., at a user mobile device 108 associated with the carpool driver). In some embodiments, users may opt in to be a carpool driver, for example, using the app. In such embodiment, the user may opt to be available as a driver for a dynamic transit route, for example, during a specified time period (e.g., a day of the week and/or a time of day), during which generated dynamic transit routes may be assigned by TA computing device 102 to the driver.

In some embodiments, the transit vehicle computing device may be associated with (e.g., onboard) connected vehicle 112 and/or an autonomous vehicle. In embodiments where the dynamic transit routes are received by an autonomous vehicle, the autonomous vehicle may be configured to autonomously travel the dynamic transit route, for example, to collect and drop of users associated with the dynamic transit route.

In some embodiments, TA computing device 102 may be used to facilitate providing insurance coverage for users of dynamic transit routes. For example, TA computing device 102 may calculate an amount of risk associated with one or more upcoming trips taken by the user, for example, utilizing machine learning techniques and/or AI techniques. TA computing device 102 may calculate an insurance premium by applying, for example, a set of insurance rules to the calculated amount of risk. The premium may be calculated by TA computing device 102 based at least in part upon, for example, an expected number of trips using the dynamic transit routes for a next period (e.g., one month), and/or specific upcoming trips using the dynamic transit routes where the user has confirmed that the user will utilize the dynamic transit routes for the upcoming trips (e.g., by submitting a response message via the app).

In some embodiments, a user may be enrolled in an insurance policy that assesses the user based at least in part upon the user's actual transportation behavior (e.g., a usage-based insurance policy). In such embodiments, a user may have an insurance premium for the usage-based insurance policy reduced for utilizing the dynamic transit routes instead of another form of transit (e.g., driving oneself). TA computing device 102 may display such a discount to the user, for example, via the app and/or a message as a potential benefit statistic as described above.

Exemplary Data Structures

FIG. 2 depicts exemplary data structure 200. Data structure 200 may be implemented in, for example database 106 (shown in FIG. 1). Data structure 200 may include, for example, user identifiers 202, telematics data 204, transit models 206, and/or transit predictions 208. User identifiers 202 may correspond to individual users of TA system 100 (shown in FIG. 1), for example, users who have opted in to transportation services utilizing TA computing device 102 (shown in FIG. 1). User identifiers 202 may also be associated with, for example, a user mobile device 108 and/or a connected vehicle 112 (shown in FIG. 1) corresponding to (e.g., owned, possessed, or used by) the user. Accordingly, telematics data 204 received from such sources may be stored by TA computing device 102 in association with a corresponding user identifier 202. Telematics data 204 for a certain user identifier 202 may be used by TA computing device 102 to build a transit model 206 that is associated with the certain user identifier 202. A certain transit model 206 that is associated with a certain user identifier 202 may in turn be used by TA computing device 102 to generate transit predictions 208 associated with the certain user identifier 202.

Exemplary Client Computing Devices

Figure 3:
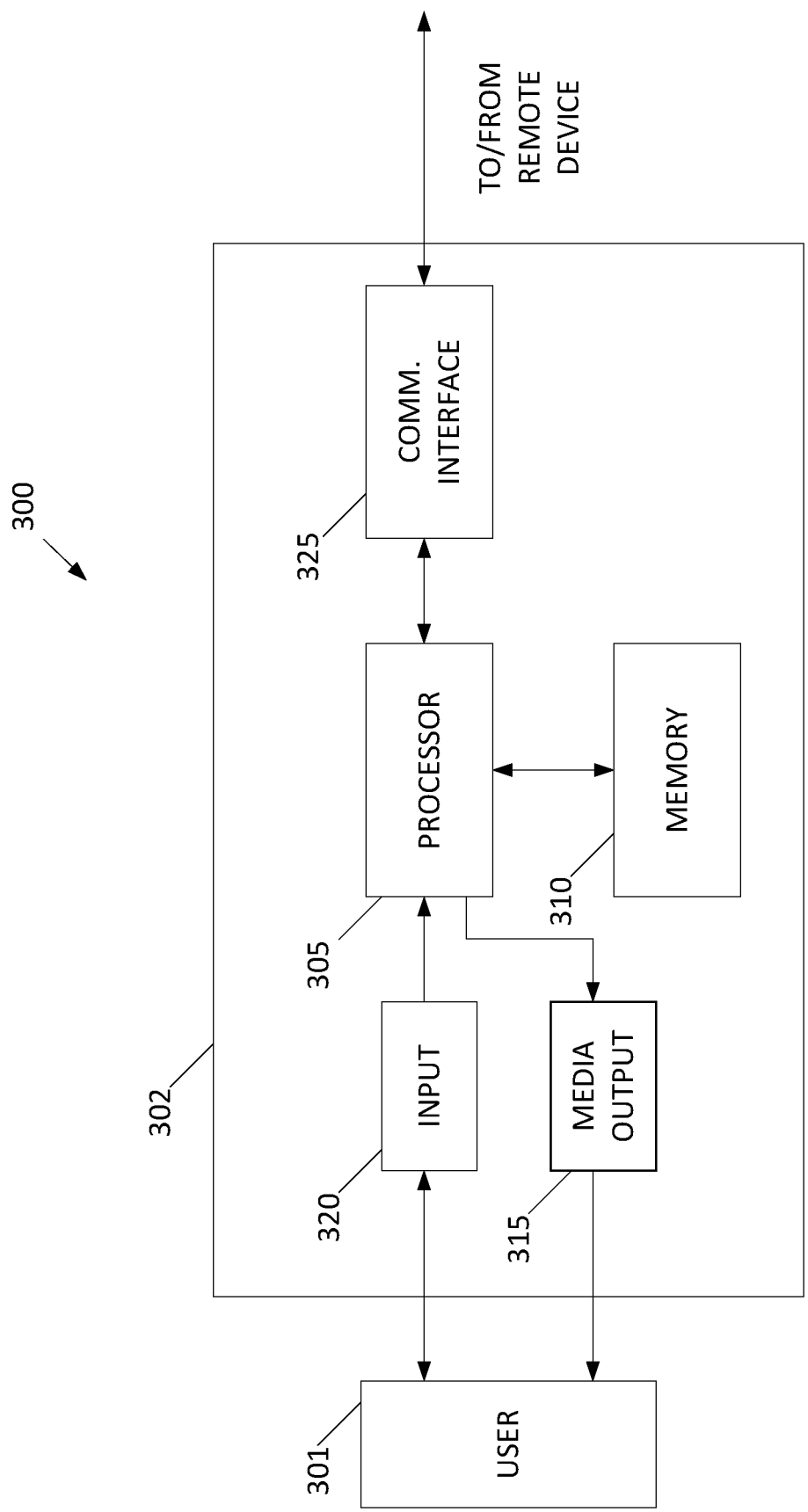
FIG. 3 depicts an exemplary client computing device that may be used with the TA system illustrated in FIG. 1.

FIG. 3 depicts an exemplary client computing device 302 in an environment 300. Client computing device 302 may be, for example, at least one of TA computing device 102, user mobile device 108 and/or transit vehicle computing device 110 (all shown in FIG. 1).

Client computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or other data to be stored and retrieved. Memory area 310 may include one or more computer readable media.

In exemplary embodiments, client computing device 302 may also include one media output component 315 for presenting information to a user 301. Media output component 315 may be any component capable of conveying information to user 301. In some embodiments, media output component 315 may include an output adapter such as a video adapter and/or an audio adapter. An output adapter may be operatively coupled to processor 305 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

Client computing device 302 may also include an input device 320 for receiving input from user 301. Input device 320 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 315 and input device 320.

Client computing device 302 may also include a communication interface 325, which can be communicatively coupled to a remote device such as TA computing device 102 (shown in FIG. 1). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

In some embodiments, client computing device 302 may also include sensors 340. Sensors 340 may include, for example, an accelerometer, a global positioning system (GPS), or a gyroscope. Sensors 340 may be used to collect data (e.g., telematics data 204 shown in FIG. 2), which may be transmitted by client computing device 302 a remote device such as TA computing device 102 (shown in FIG. 1).

Stored in memory area 310 may be, for example, computer readable instructions for providing a user interface to user 301 via media output component 315 and, optionally, receiving and processing input from input device 320. A user interface may include, among other possibilities, a web browser and client application. Web browsers may enable users, such as user 301, to display and interact with media and other information typically embedded on a web page or a website. A client application may allow user 301 to interact with a server application from TA computing device 102 (shown in FIG. 1).

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Server Systems

Figure 4:
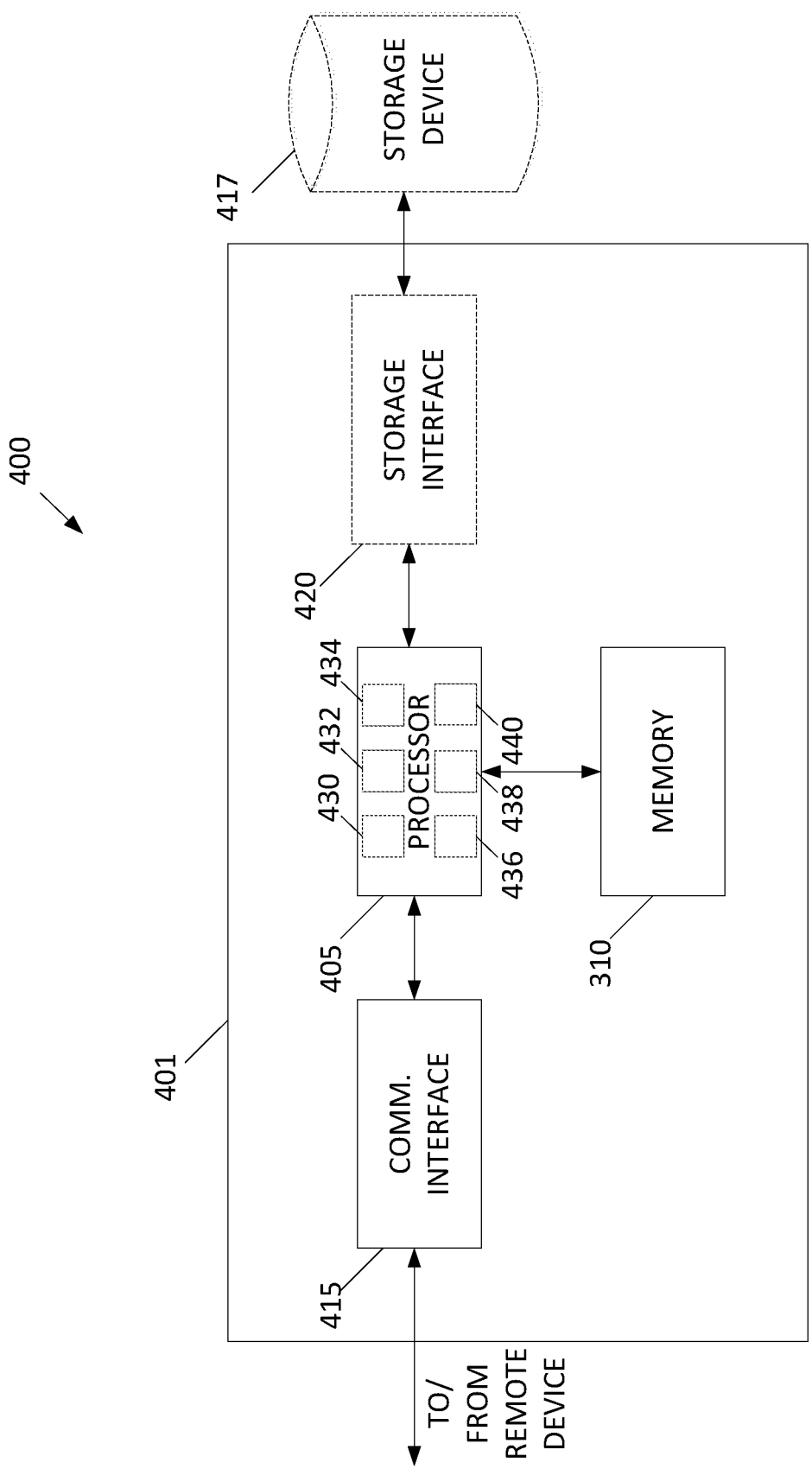
FIG. 4 depicts an exemplary server system that may be used with the TA system illustrated in FIG. 1.

FIG. 4 depicts an exemplary server system 410 (e.g., in environment 400) that may be used with TA system 100 illustrated in FIG. 1. Server system 401 may be, for example, TA computing device 102 (shown in FIG. 1).

In exemplary embodiments, server system 401 may include a processor 405 for executing instructions. Instructions may be stored in a memory area 410. Processor 405 may include one or more processing units (e.g., in a multi-core configuration) for executing instructions. The instructions may be executed within a variety of different operating systems on server system 401, such as UNIX, LINUX, Microsoft Windows®, etc. It should also be appreciated that upon initiation of a computer-based method, various instructions may be executed during initialization. Some operations may be needed in order to perform one or more processes described herein, while other operations may be more general and/or specific to a particular programming language (e.g., C, C #, C++, Java, or other suitable programming languages, etc.).

Processor 405 may be operatively coupled to a communication interface 415 such that server system 401 is capable of communicating with user mobile device 108, transit vehicle computing device 110 (all shown in FIG. 1), or another server system 401. For example, communication interface 415 may receive requests from user mobile device 108 via the Internet.

Processor 405 may also be operatively coupled to a storage device 417, such as database 106 (shown in FIG. 1). Storage device 417 may be any computer-operated hardware suitable for storing and/or retrieving data. In some embodiments, storage device 417 may be integrated in server system 401. For example, server system 401 may include one or more hard disk drives as storage device 417.

In other embodiments, storage device 417 may be external to server system 401 and may be accessed by a plurality of server systems 401. For example, storage device 417 may include multiple storage units such as hard disks or solid state disks in a redundant array of inexpensive disks (RAID) configuration. Storage device 417 may include a storage area network (SAN) and/or a network attached storage (NAS) system.

In some embodiments, processor 405 may be operatively coupled to storage device 417 via a storage interface 420. Storage interface 420 may be any component capable of providing processor 405 with access to storage device 417. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 417.

In exemplary embodiments, processor 405 may include and/or be communicatively coupled to one or more modules for implementing the systems and methods described herein. For example, processor 405 may include one or more of a communication module 430, a data management module 432, a model building module 434, a transit prediction generating module 436, a dynamic transit route generating module 438, and/or a calculating module 440.

In some embodiments, communication module 430 may be configured, for example to receive telematics data from the plurality of user mobile devices, each user mobile device of the plurality of user mobile devices corresponding to one user identifier of a plurality of user identifiers, to generate a notification message including the dynamic transit route, to transmit the notification message to a candidate user mobile device corresponding to a candidate user identifier associated with the dynamic transit route, to receive a response message from the candidate user mobile device including an indicator that a user accepts or declines the dynamic transit route, to receive telematics data from a connected vehicle corresponding to one user identifier of the plurality of user identifiers, and/or to transmit the dynamic transit route to a transit vehicle computing device.

In some embodiments, data management module 432 may be configured, for example, to store the telematics data in a database in association with the plurality of user identifiers.

In some embodiments, model building module 434 may be configured, for example, to build, for each user identifier of the plurality of user identifiers, a transit model.

In some embodiments, transit prediction generating module 436 may be configured, for example, to generate, for each user identifier of the plurality of user identifiers, based at least in part upon the transit model associated with the user identifier, one or more transit predictions.

In some embodiments, dynamic transit route generating module 428 may be configured, for example, to generate, based at least in part upon the one or more transit predictions, for each user identifier of the plurality of user identifiers, a dynamic transit route, and/or to modify the dynamic transit route based at least in part upon an indicator.

In some embodiments, calculation module 440 may be configured, for example, to calculate, based at least in part upon the telematics data associated with the candidate user identifier, a potential benefit statistic.

Memory area 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Connected Vehicles

Figure 5:
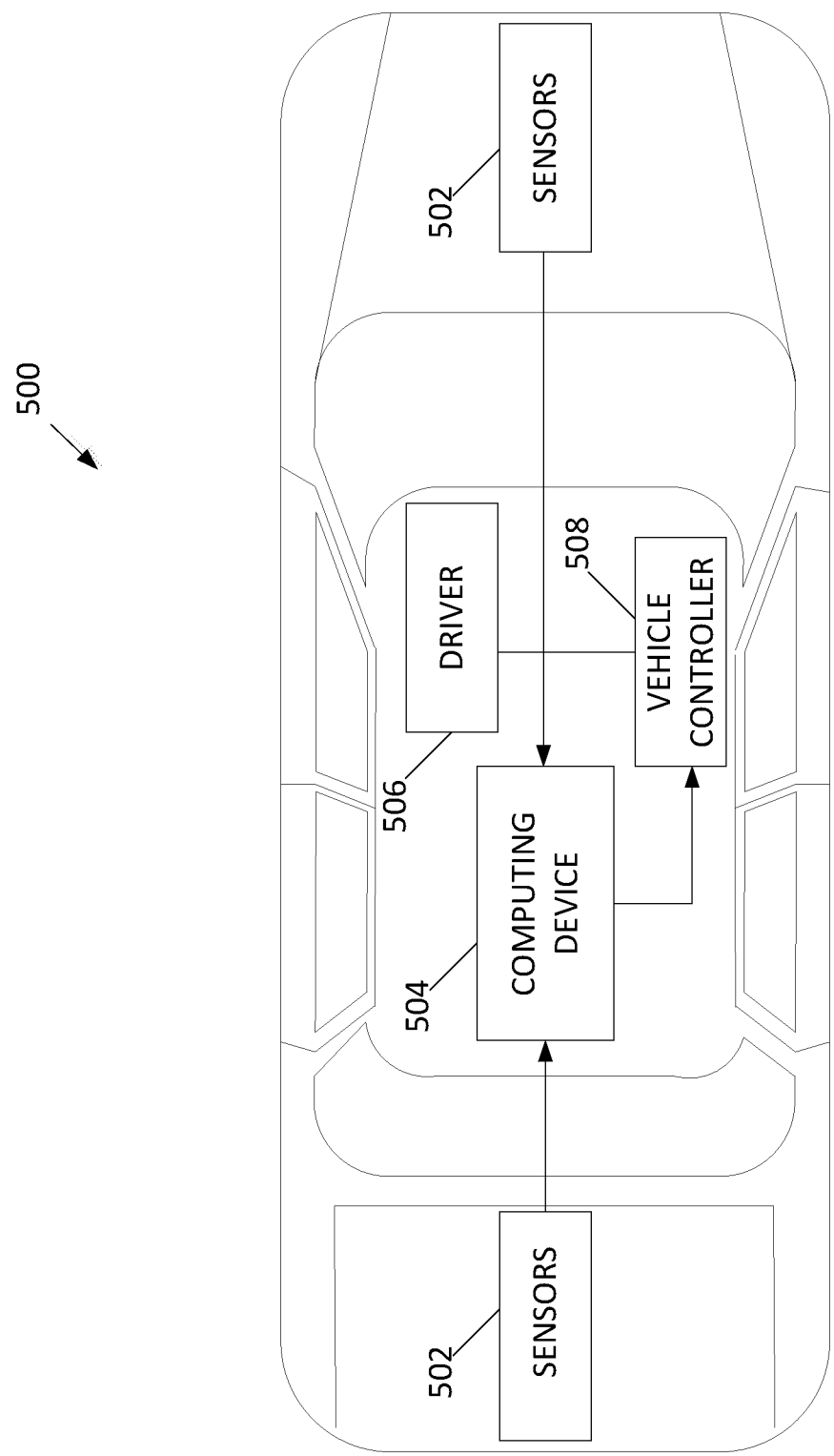
FIG. 5 depicts an exemplary connected vehicle that may be used with the TA system illustrated in FIG. 1.

FIG. 5 depicts an exemplary connected vehicle 500. Connected vehicle 500 may be, for example, connected vehicle 112 (shown in FIG. 1). Connected vehicle 500 may include a plurality of sensors 502 and a computing device 504. Sensors 502 may include, but are not limited to, temperature sensors, terrain sensors, weather sensors, accelerometers, gyroscopes, radar, LIDAR, Global Positioning System (GPS), video devices, imaging devices, cameras (e.g., 2D and 3D cameras), audio recorders, and computer vision. In some embodiments, sensors 502 may be used to collect, for example, telematics data 204 (shown in FIG. 2), as described above.

Such telematics data 204 collected by sensors 502 may be transmitted to TA computing device 102 (shown in FIG. 1). The telematics data 204 may be transmitted, for example, through a cellular-based or WLAN-based V2V, V2I, or V2N connection.

Computing device 504 may be implemented, for example, as client computing device 302 (shown in FIG. 3). In exemplary embodiments, computing device 504 may receive data from sensors 502. In embodiments where TA computing device 102 is remote from connected vehicle 500, computing device 504 may transmit data received from sensors 502 (e.g., vehicle telematics data) to TA computing device 102. In some embodiments, computing device 504 may include one or more of TA computing device 102, user mobile device 108, and/or transit vehicle computing device 110.

In exemplary embodiments, vehicle controller 508 may control at least some operation of connected vehicle 500. For example, vehicle controller 508 may steer, accelerate, or decelerate connected vehicle 500 based at least in part upon data received, for example, from sensors 502. In some embodiments, vehicle controller 508 may include a display screen or touchscreen (not shown) that is capable of displaying information to and/or receiving input from driver 506. In embodiments where computing device 504 includes and/or is in communication with TA computing device 102 and/or transit vehicle computing device 110, computing device 504 may instruct vehicle controller 508 to implement a generated and/or received dynamic transit route (e.g., by traveling and making pick up and/or drop off stops along the route).

In other embodiments, vehicle controller 508 may be capable of wirelessly communicating with a user device such as user mobile device 108 in connected vehicle 500. In these embodiments, vehicle controller 508 may be capable of communicating with the user of user mobile device 108, such as driver 506, through an application on user mobile device 108. In some embodiments, computing device 504 may include vehicle controller 508.

Figure 6:
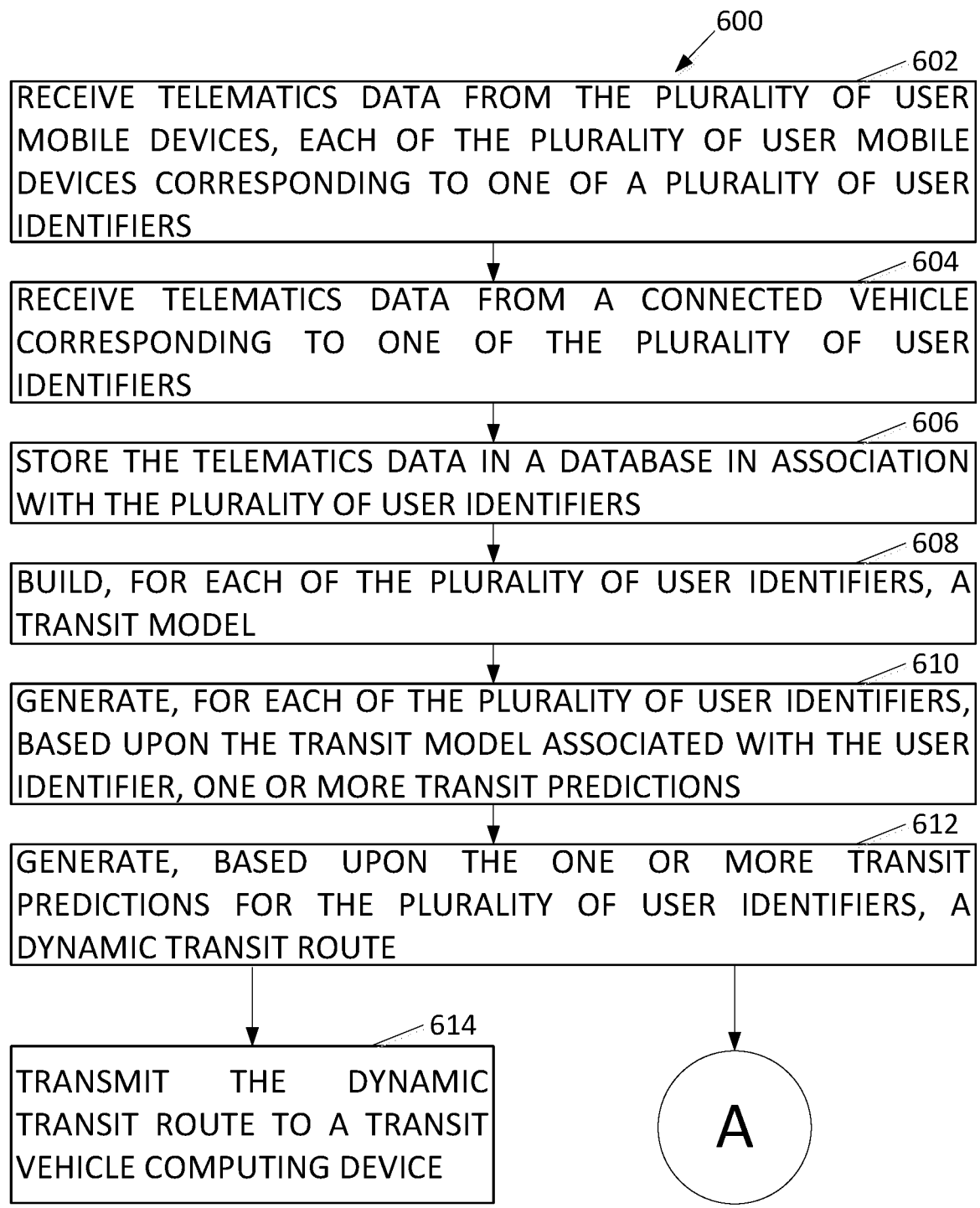
FIG. 6 illustrates an exemplary computer-implemented method for generating dynamic transit routes that may be performed by the TA system illustrated in FIG. 1.
Figure 7:
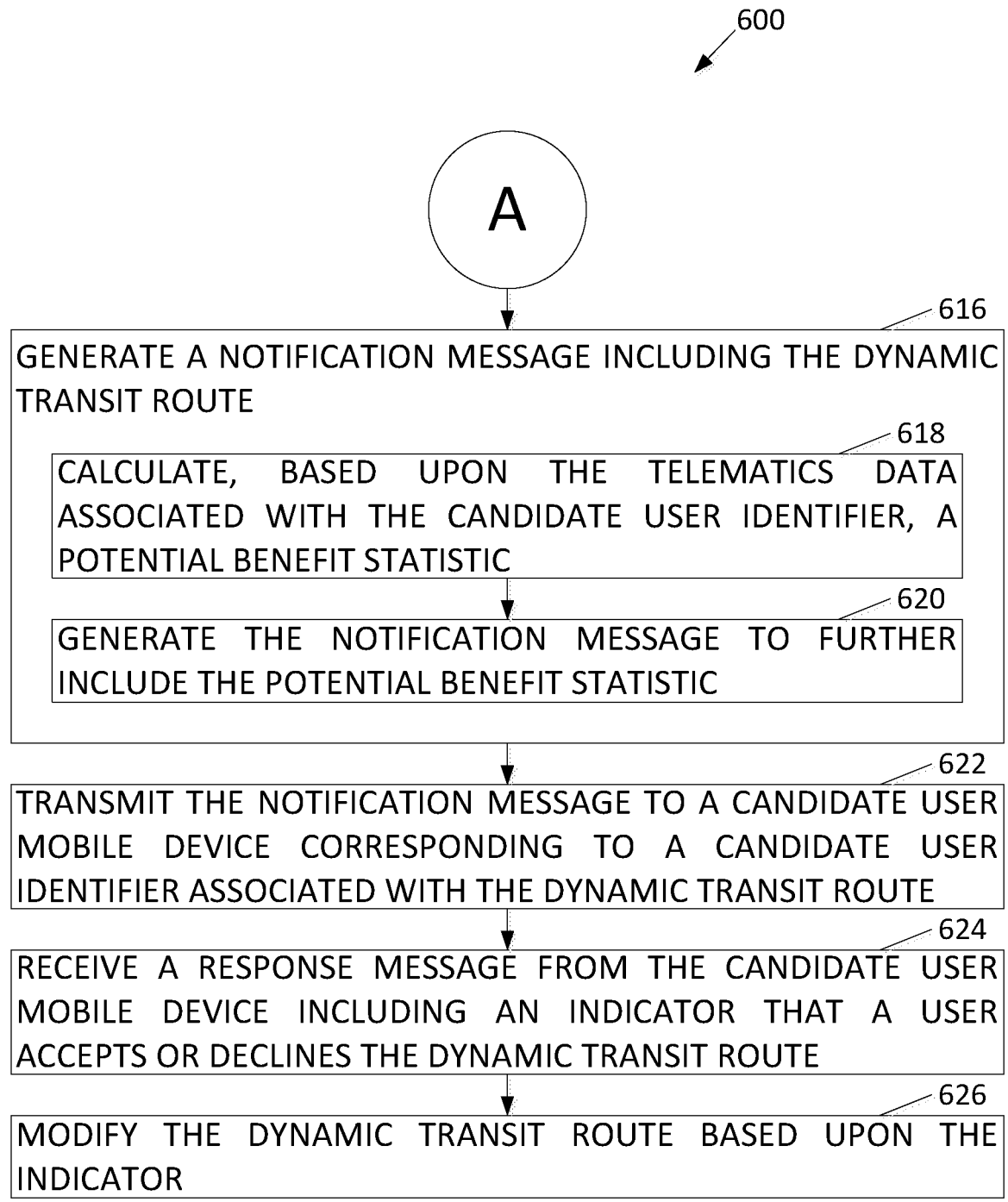
FIG. 7 is a continuation of the exemplary computer-implemented method illustrated in FIG. 6.

Exemplary Methods for Determining an Insurance Premium of a Driver Identified by the Va System FIG. 6 and FIG. 7 illustrate an exemplary computer-implemented method 600 for generating dynamic transit routes based at least in part upon telematics data that may be implemented using one or more components of TA system 100 (shown in FIG. 1).

Computer-implemented method 600 may include receiving 602 telematics data (e.g., telematics data 204) from the plurality of user mobile devices (e.g., user mobile device 108). Each user mobile device of the plurality of user mobile devices may correspond to one user identifier of a plurality of user identifiers (e.g., user identifiers 202). In some embodiments, computer-implemented method 600 may further include receiving 604 telematics data from a connected vehicle (e.g., connected vehicle 112) corresponding to one user identifier of the plurality of user identifiers. In some embodiments receiving 602 telematics data from the plurality of user mobile devices and/or receiving 604 telematics data from the connected vehicle may be performed by TA computing device 102 (shown in FIG. 1), for example, by executing communication module 430 (shown in FIG. 4).

Computer-implemented method 600 may further include storing 606 the telematics data in a database (e.g., database 106) in association with the plurality of user identifiers. In some embodiments, storing 606 the telematics data may be performed by TA computing device 102, for example, by executing data management module 432 (shown in FIG. 4).

Computer-implemented method 600 may further include building 608, for each user identifier of the plurality of user identifiers, a transit model (e.g., transit models 206). In some embodiments, building 608 the transit models may be performed by TA computing device 102, for example, by executing model building module 434 (shown in FIG. 4).

Computer-implemented method 600 may further include generating 610, for each user identifier of the plurality of user identifiers, based at least in part upon the transit model associated with the user identifier, one or more transit predictions (e.g., transit predictions 208). In some embodiments, each of the one or more transit predictions includes a predicted time, a predicted origin location, and a predicted destination location. In some embodiments, generating 610 the transit predictions may be performed by TA computing device 102, for example, by executing transit prediction generating module 436 (shown in FIG. 4).

Computer-implemented method 600 may further include generating 612, based at least in part upon the one or more transit predictions, for each user identifier of the plurality of user identifiers, a dynamic transit route. In some embodiments, generating 612 the dynamic transit route may be performed by TA computing device 102, for example, by executing dynamic transit route generating module 438 (shown in FIG. 4).

In some embodiments, computer-implemented method 600 may further include transmitting 614 the dynamic transit route to a transit vehicle computing device (e.g., transit vehicle computing device 110). In some such embodiments, the transit vehicle computing device corresponds to an autonomous vehicle configured to autonomously travel the dynamic transit route to provide a transit service. In some such embodiments, transmitting 614 the dynamic transit route may be performed by TA computing device 102, for example, by executing communication module 430.

In some embodiments, computer-implemented method 600 may further include generating 616 a notification message including the dynamic transit route. In some such embodiments, generating 616 the notification message may be performed by TA computing device 102, for example, by executing communication module 430.

In some such embodiments, computer-implemented method 600 may further include calculating 618, based at least in part upon the telematics data associated with the candidate user identifier, a potential benefit statistic, and generating 620 the notification message to further include the potential benefit statistic. In some such embodiments, calculating 618 the potential benefit statistic may be performed by TA computing device 102, for example, by executing calculating module 440 (shown in FIG. 4).

In such embodiments, computer-implemented method 600 may further include transmitting 622 the notification message to a candidate user mobile device corresponding to a candidate user identifier associated with the dynamic transit route. In some such embodiments, transmitting 622 the notification message may be performed by TA computing device 102, for example, by executing communication module 430.

In some such embodiments, computer-implemented method 600 may further include receiving 624 a response message from the candidate user mobile device including an indicator that a user accepts or declines the dynamic transit route, and modifying 626 the dynamic transit route based at least in part upon the indicator. In some such embodiments, receiving 624 the notification message may be performed by TA computing device 102, for example, by executing communication module 430. In some such embodiments, modifying 626 the dynamic transit route may be performed by TA computing device 102, for example, by executing dynamic transit route generating module 438.

Examples of Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based at least in part upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian program learning (BPL), reinforced learning techniques, voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based at least in part upon the discovered rule, accurately predict the correct output. In unsupervised machine learning, the processing element may be needed to find its own structure in unlabeled example inputs.

As described above, the systems and methods described herein may use machine learning, for example, for pattern recognition. That is, machine learning algorithms may be used by TA computing device 102 to attempt to identify patterns within telematics data 204, for example, to build a transit model 206 characterizing the transit behavior of a user. Further, machine learning algorithms may be used by TA computing device 102 to generate transit predictions 208 of the future transportation behavior based at least in part upon transit model 206. Further, machine learning algorithms may be used by TA computing device 102 to generate dynamic transit routes based at least in part upon transit predictions 208. Accordingly, the systems and methods described herein may use machine learning algorithms for both pattern recognition and predictive modeling.

Exemplary Embodiments

In one aspect, a transit analytics (TA) computing device including one processor in communication with at least one memory device and a plurality of user mobile devices may be provided. The at least one processor may be configured to: (1) receive telematics data from the plurality of user mobile devices, each user mobile device of the plurality of user mobile devices corresponding to one user identifier of a plurality of user identifiers; (2) store the telematics data in a database in association with the plurality of user identifiers; (3) build, for each user identifier of the plurality of user identifiers, a transit model; (4) generate, for each user identifier of the plurality of user identifiers, based at least in part upon the transit model associated with the user identifier, one or more transit predictions; and/or (5) generate, based at least in part upon the one or more transit predictions, for each user identifier of the plurality of user identifiers, a dynamic transit route. The TA computing device may include additional, less, or alternate functionality, including that discussed elsewhere herein.

In another aspect, a computer-implemented method may be provided. The computer-implemented method may be performed by a transit analytics (TA) computing device including one processor in communication with at least one memory device and a plurality of user mobile devices. The computer-implemented method may include: (1) receiving, by the TA computing device, telematics data from the plurality of user mobile devices, each user mobile device of the plurality of user mobile devices corresponding to one user identifier of a plurality of user identifiers; (2) storing, by the TA computing device, the telematics data in a database in association with the plurality of user identifiers; (3) building, by the TA computing device, for each user identifier of the plurality of user identifiers, a transit model; (4) generating, by the TA computing device, for each user identifier of the plurality of user identifiers, based at least in part upon the transit model associated with the user identifier, one or more transit predictions; and/or (5) generating, by the TA computing device, based at least in part upon the one or more transit predictions, for each user identifier of the plurality of user identifiers, a dynamic transit route. The computer-implemented method may include additional, less, or alternate actions, including those discussed elsewhere herein.

In another aspect, at least one non-transitory computer-readable media having computer-executable instructions embodied thereon may be provided that, when executed by a transit analytics (TA) computing device including one processor in communication with at least one memory device and a plurality of user mobile devices, may cause the at least one processor to: (1) receive telematics data from the plurality of user mobile devices, each user mobile device of the plurality of user mobile devices corresponding to one user identifier of a plurality of user identifiers; (2) store the telematics data in a database in association with the plurality of user identifiers; (3) build, for each user identifier of the plurality of user identifiers, a transit model; (4) generate, for each user identifier of the plurality of user identifiers, based at least in part upon the transit model associated with the user identifier, one or more transit predictions; and/or (5) generate, based at least in part upon the one or more transit predictions, for each user identifier of the plurality of user identifiers, a dynamic transit route. The computer-executable instructions may direct additional, less, or alternate functionality, including that discussed elsewhere herein.

Additional Considerations

As will be appreciated based at least in part upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an example embodiment, the system is executed on a single computer system, without needing a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

In some embodiments, registration of users for TA system 100 includes opt-in informed consent of users to data usage consistent with consumer protection laws and privacy regulations. In some embodiments, the collected data may be anonymized and/or aggregated prior to receipt such that no personally identifiable information (PII) is received. In other embodiments, the system may be configured to receive registration data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals, or may make use of such personal information, the individuals may be provided with an opportunity to control whether such information is collected or to control whether and/or how such information is used. In addition, certain data may be processed in one or more ways before it is stored or used, so that personally identifiable information is removed.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

We claim:

1. A transit analytics (TA) computing device comprising:
at least one processor; and
at least one memory device, storing computing instructions that, when executed on the at least one processor, cause the at least one processor to perform operations comprising:
continuously receive telematics data from a mobile device of a user;
build, based at least in part upon the telematics data associated with the user, a transit model associated with the user using a machine learning algorithm, the transit model including one or more transit patterns of the user;
generate, based at least in part upon the transit model associated with the user, a dynamic transit route;
calculate, based at least in part upon the telematics data associated with the user, a potential benefit statistic, the potential benefit statistic including at least one of an amount of fuel cost savings, insurance savings, or environmental pollution reduction for the user if the user were to utilize the dynamic transit route;
generate a notification message including the dynamic transit route and the potential benefit statistic; and
transmit the notification message to the mobile device of the user.

2. The TA computing device of claim 1, wherein the computing instructions, when executed on the at least one processor, further causes the at least one processor to perform operations comprising:
receive a response message from the mobile device of the user including an indicator that the user accepts or declines the dynamic transit route; and
modify the dynamic transit route based at least in part upon the indicator.

3. The TA computing device of claim 1, wherein the computing instructions, when executed on the at least one processor, further causes the at least one processor to perform an operation comprising:
transmit the dynamic transit route to a transit vehicle computing device.

4. The TA computing device of claim 3, wherein the transit vehicle computing device corresponds to an autonomous vehicle donfigured to autonomously travel the dynamic transit route to provide a transit service.

5. The TA computing device of claim 1, wherein the mobile device comprises a connected vehicle.

6. The TA computing device of claim 1, wherein generate the dynamic transit route further includes:
determine, based at least in part upon the transit model associated with the user, one or more transit predictions, the one or more transit predictions including a predicted time, a predicted origin location, and a predicted destination location; and
generate, based at least in part upon the one or more transit predictions, the dynamic transit route.

7. A computer-implemented method performed by a transit analytics (TA) computing device being implemented via execution of computing instructions configured to run on at least one processor and stored on at least one memory device, the computer-implemented method comprising:
continuously receiving, by the TA computing device, telematics data from a mobile device of a user;
building, based at least in part upon the telematics data associated with the user, by the TA computing device, a transit model associated with the user using a machine learning algorithm, the transit model including one or more transit patterns of the user;
generating, by the TA computing device, based at least in part upon the transit model associated with the user, a dynamic transit route;
calculating, based at least in part upon the telematics data associated with the user, a potential benefit statistic, the potential benefit statistic including at least one of an amount of fuel cost savings, insurance savings, or environmental pollution reduction for the user if the user were to utilize the dynamic transit route;
generating, by the TA computing device, a notification message including the dynamic transit route and the potential benefit statistic; and
transmitting, by the TA computing device, the notification message to the mobile device of the user.

8. The computer-implemented method of claim 7, further comprising:
receiving, by the TA computing device, a response message from the mobile device of the user including an indicator that the user accepts or declines the dynamic transit route; and
modifying, by the TA computing device, the dynamic transit route based at least in part upon the indicator.

9. The computer-implemented method of claim 7, further comprising:
transmitting, by the TA computing device, the dynamic transit route to a transit vehicle computing device.

10. The computer-implemented method of claim 9, wherein the transit vehicle computimg device corresponds to an autonomous vehicle configured to autonomously travel the dynamic transit route to provide a transit service.

11. The computer-implemented method of claim 7, wherein the mobile device comprises a connected vehicle.

12. The computer-implemented method of claim 7, wherein generating the dynamic transit route further includes:
   determining, based at least in part upon the transit model associated with the user, one or more transit predictions, the one or more transit predictions including a predicted time, a predicted origin location, and a predicted destination location; and
   generating, based at least in part upon the one or more transit predictions, the dynamic transit route.

13. At least one non-transitory computer-readable media, storing computing instructions embodied thereon that, when executed by at least one processor of a transit analytics (TA) computing device, cause the at least one processor to perform operations comprising:
   continuously receive telematics data from a mobile device of a user;
   build, based at least in part upon the telematics data associated with the user, a transit model associated with the user using a machine learning algorithm, the transit model including one or more transit patterns of the user;
   generate, based at least in part upon the transit model associated with the user, a dynamic transit route;
   calculate, based at least in part upon the telematics data associated with the user, a potential benefit statistic, the potential benefit statistic including at least one of an amount of fuel cost savings, insurance savings, or environmental pollution reduction for the user if the user were to utilize the dynamic transit route;
   generate a notification message including the dynamic transit route and the potential benefit statistic; and
   transmit the notification message to the mobile device of the user.

14. The at least one non-transitory computer-readable media of claim 13, wherein the computing instructions, when executed by the at least one processor of the TA computing device, further cause the at least one processor to perform an operation comprising:
   receive a response message from the mobile device of the user including an indicator that the user accepts or declines the dynamic transit route.

15. The at least one non-transitory computer-readable media of claim 14, wherein the computing instructions, when executed by the at least one processor of the TA computing device, further cause the at least one processor to perform an operation comprising:
   modify the dynamic transit route based at least in part upon the indicator.

16. The at least one non-transitory computer-readable media of claim 13, wherein the computing instructions, when executed by the at least one processor of the TA computing device, further cause the at least one processor to perform an operation comprising:
   transmit the dynamic transit route to a transit vehicle computing device.

17. The at least one non-transitory computer-readable media of claim 16, wherein the transit vehicle computing device corresponds to an autonomous vehicle configured to autonomously travel the dynamic transit route to provide a transit service.

18. The at least one non-transitory computer-readable media of claim 13, wherein the mobile device comprises a connected vehicle.

19. The at least one non-transitory computer-readable media of claim 13, wherein generate the dynamic transit route further includes:
   determine, based at least in part upon the transit model associated with the user, one or more transit predictions, the one or more transit predictions including a predicted time, a predicted origin location, and a predicted destination location.

20. The at least one non-transitory computer-readable media of claim 19, wherein generate the dynamic transit route further includes:
   generate, based at least in part upon the one or more transit predictions, the dynamic transit route.

* * * * *